(12) United States Patent
Duerr et al.

(10) Patent No.: US 8,616,523 B2
(45) Date of Patent: Dec. 31, 2013

(54) LOW-PRESSURE VALVE WITH AN INNER AND OUTER THROUGHFLOW CROSS SECTION

(75) Inventors: Michael Duerr, Horb (DE); Joerg Weingart, Horb (DE); Peter Schwaderer, Wildberg (DE)

(73) Assignee: Robert Bosch GmbH, Stuttgart (DE)

( * ) Notice: Subject to any disclaimer, the term of this patent is extended or adjusted under 35 U.S.C. 154(b) by 344 days.

(21) Appl. No.: 13/008,594

(22) Filed: Jan. 18, 2011

(65) Prior Publication Data

US 2011/0175004 A1    Jul. 21, 2011

(30) Foreign Application Priority Data

Jan. 20, 2010   (DE) .................. 10 2010 005 168

(51) Int. Cl.
*F16K 31/02*       (2006.01)
(52) U.S. Cl.
USPC ............... 251/129.15; 251/129.01; 251/321; 137/516.13; 137/516.15
(58) Field of Classification Search
USPC ......... 251/65, 129.15, 129.17, 129.19, 129.1, 251/321, 333, 339, 359; 137/516.13–516.23, 625.33

See application file for complete search history.

(56) References Cited

U.S. PATENT DOCUMENTS

| | | | |
|---|---|---|---|
| 5,927,331 A * | 7/1999 | Suzuki | 137/625.33 |
| 6,230,991 B1 * | 5/2001 | Steinruck et al. | 239/585.1 |
| 6,619,322 B1 * | 9/2003 | Wojciechowski et al. | 137/625.33 |
| 7,077,378 B2 | 7/2006 | Rampen et al. | |
| 7,549,438 B2 * | 6/2009 | Koenekamp | 137/341 |

FOREIGN PATENT DOCUMENTS

EP    1537333 B1    6/2006

* cited by examiner

*Primary Examiner* — John K Fristoe, Jr.
*Assistant Examiner* — Marina Tietjen
(74) *Attorney, Agent, or Firm* — Maginot, Moore & Beck (57) ABSTRACT

An electromagnetically actuated valve with a valve body which is assigned to a valve seat, is mechanically prestressed in a first direction toward a first switching position and can be adjusted by means of a magnetic actuator in a second, opposite direction into a second switching position is disclosed. The valve body has a planar contact surface which can be brought into sealing contact with a surface of the valve seat, which surface is planar at least in sections.

19 Claims, 4 Drawing Sheets

LOW-PRESSURE VALVE WITH AN INNER AND OUTER THROUGHFLOW CROSS SECTION

This application claims priority under 35 U.S.C. §119 to German patent application no. 10 2010 005 168.3, filed Jan. 20, 2010, the disclosure of which is incorporated herein by reference in its entirety.

BACKGROUND

The disclosure relates to a preferably electro-magnetically actuated valve and in particular to a low-pressure valve, as used, for example, in a hydraulic machine.

Valve-controlled hydraulic machines of this type are known, for example, from EP 1 537 333 B1. The European patent document shows a hydraulic machine of axial or radial piston construction which can be operated in principle as a motor or as a pump, with the volumetric delivery or capacity being adjustable via the valve timing gear. In an exemplary embodiment which is described, the hydraulic machine is embodied in the form of an axial piston machine, wherein a multiplicity of pistons arranged in a cylinder is supported on a rotatably mounted swash plate. Each piston together with the associated cylinder space delimits a working space which can be connected via a valve on the low-pressure side and a valve on the high-pressure side to a pressure medium inlet or to a pressure medium outlet.

In the known solution, the two valves are embodied in the form of electrically releasable or lockable nonreturn valves which are actuable via the pump timing gear in order to operate the particular working space in "full mode", in "partial mode" or in "idle mode". As a result, the volumetric delivery or capacity can be adjusted in an infinitely variable manner from a maximum value to 0. The hydraulic machine is operated in accordance with a regulating algorithm via a control unit in order to obtain a total volumetric delivery flow (pump) or total capacity flow (motor) with as few pulsations as possible. The volumetric flow is frequently adjusted by a phase-gating control, but may also be adjusted by a phase-chopping control.

Hydraulic machines with a capacity/volumetric delivery which can be changed via the valve timing gear are also referred to as digital displacement units (DDU). All positive displacement principles are basically applicable in this case. However, piston machines, in particular of radial piston construction, are advantageous, since said piston machines make it possible to separately form and therefore actively control the input and output for each positive displacer. In this case, it may be highly expedient to differentiate between pump and motor operation such that then the control element may differ in appearance for the low-pressure and high-pressure connections.

A prerequisite for the above-described type of control (DDU) is that the valves on the low-pressure and high-pressure sides can be switched in highly dynamic fashion such that the above-described pressure medium flow paths can be very rapidly blocked off or opened up for flow. The control elements on the low-pressure side or high-pressure side can be embodied in the form of, for example, switching valves, preferably of seat-type construction, which are preferably actuable by a magnetic actuator. Various and sometimes contradictory requirements are imposed on a valve of this type. A hydraulic machine which is minimized in respect of construction space requires a valve, the overall dimensions of which are small and which has a flow cross section with is as large as possible and is therefore low in resistance. However, such a large flow cross section requires a greater valve lift, this contradicting the requirement for high valve dynamics with as little electrical power consumption as possible. Furthermore, the requirements imposed on the valve vary at different operating points of the hydraulic machine. For example, large volumetric flows and requirements for low switching times arise from high rotational speeds, and low rotational speeds are associated with long switching-on periods for the magnet coils. The mechanical loads and requirements imposed on the sealing system also change via the pressure prevailing at the particular connection.

U.S. Pat. No. 7,077,378 B2 discloses a valve on the low-pressure side for a hydraulic machine of this type, wherein an annular throughflow opening is closed by an approximately cup-shaped valve element. Said annular throughflow opening is bounded by an inner and an outer sealing seat, and therefore the specific surface pressure on the sealing edge is comparatively low compared to a conventional valve cone. In the known solution, the platelike or cup-shaped valve element is prestressed into an open position via a spring and can be adjusted by means of a magnetic actuator into its closed position in which the valve element rests on the above-described sealing seats and the throughflow opening is blocked. During flow through said valve, the platelike valve element, which is prestressed in the opening direction thereof, can be acted upon by flow forces effective in the closing direction, and therefore the throughflow cross section is reduced and, correspondingly, the pressure loss is increased. Although said undesirable closing movement could be countered by a more powerful opening spring, the valve dynamics would deteriorate as a result or a more powerful magnetic coil together with associated power electronics would be necessary. To avoid this drawback, use is made, according to U.S. Pat. No. 7,077,378 B2, of a permanent magnet which acts upon the valve element in the open position thereof with a magnetic force. When the magnetic actuator is energized, the field of the permanent magnet is neutralized and, in addition, a magnetic force which is effective in the closing direction is generated. With a solution of this type, a correspondingly more efficient magnetic actuator is therefore required. In addition, this solution does not exhibit the desired dynamics either, since the field of the permanent magnet has to be weakened first before the valve element can be moved in the direction of the closed position thereof. Furthermore, a relatively high contact pressure force is required between the valve element and valve seat in order to ensure adequate tightness of the valve in the closed state.

SUMMARY

By contrast, the disclosure is based on the object of providing a low-pressure valve of this generic type, the valve having improved functionality. Furthermore, a hydraulic machine equipped therewith is to be provided.

This object is achieved by means of a low-pressure valve with the features of the present disclosure and a hydraulic machine according to the present disclosure.

According to the disclosure, the electromagnetically actuated valve of the low-pressure-valve type is formed with a valve body which is assigned to a valve seat, is prestressed in a first direction, preferably the opening direction, and can be adjusted by means of a magnetic actuator in a second direction, preferably the closing direction. The valve is provided with a flat, preferably two-edge sealing system. This means that a flat or planar (plane) annular contact surface is formed on the valve body and can be brought into sealing contact with the likewise planar (plane) valve seat. The planar contact surfaces can be produced in a simple manner, ensure a fluidtight contact connection between the valve body and valve seat, and reduce the surface pressure.

It is advantageous to divide the contact surface of the valve body radially into an outer and inner sealing edge by an encircling (annular) groove. Said groove (weakening in the material) brings about easier axial movability of the inner sealing edge (sealing surface) with respect to the outer sealing edge (sealing surface) such that the two sealing edges can easily move relative to each other in the axial direction. The tightness of the valve can thereby be improved.

A preferred development of the disclosure makes provision for a relative tilting movement to be possible between a valve tappet or magnet armature and the valve body mounted thereon. This is structurally achieved by a bore in the valve body having a radial excess size in relation to the valve tappet or magnet armature such that the valve body is held on/at the valve tappet with radial play. The valve body or the planar contact surfaces thereof can thereby be placed in a sealing manner on the (planar) valve seat even if the valve seat is aligned with respect to the valve tappet with relatively great tolerances. The outlay on production can be further reduced as a result.

According to a particular aspect of the disclosure, the valve tappet is formed or provided with only one magnet armature, wherein the valve seat bushing itself has a guide bore for the axially displaceable mounting of the valve tappet. Said guide bore forms the sole mounting of the valve tappet, and therefore tolerance chains caused by components which are used for the mounting of the valve tappet and are constructed next to one another are not produced. By this means, the functional capability of the valve is improved and the outlay on manufacturing reduced.

According to a further particular aspect of the disclosure, the low-pressure or outlet valve equipped with a flat, preferably two-edge sealing system is formed merely with the valve seat bushing and without an outer valve housing, wherein the valve seat bushing is screwed directly into the housing of the hydraulic machine. That is to say, in this case, all of the fluid flow passages which are assigned to the low-pressure valve and to date were formed in the valve housing or the outer valve bushing are now formed in the housing of the hydraulic machine. It is thereby possible to increase the flow cross sections in the valve because of the omission of the outer valve bushing and therefore to realize an increased volumetric flow. In this case, the valve may have the multiple magnet-armature construction or the simplified individual magnet-armature construction.

Finally, according to the disclosure, a hydraulic machine with preferably actively controllable valves on the low-pressure side and with valves on the high-pressure side is proposed. At least one of the valves on the low-pressure side is designed as a low-pressure valve according to one of the preceding aspects.

At this juncture, it should also be pointed out that the active controllability of the valves on the high-pressure side is not required if only pump operation is to be provided.

BRIEF DESCRIPTION OF THE DRAWINGS

The disclosure is explained in more detail below using preferred exemplary embodiments and with reference to the accompanying drawings, in which.

DETAILED DESCRIPTION

Figure 1:
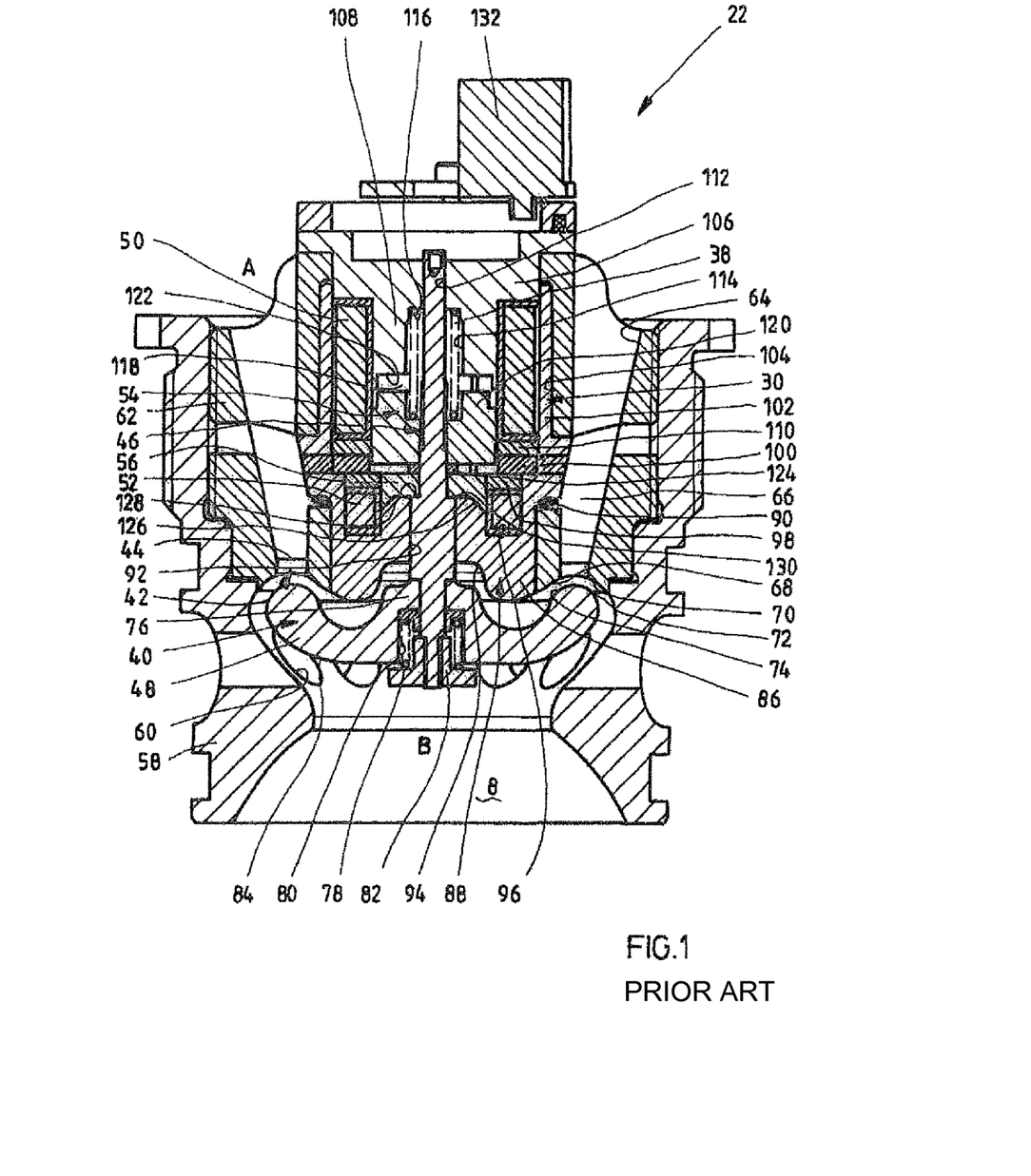
FIG. 1 shows a longitudinal section through a valve on the low-pressure side of a hydraulic machine (for example of a swash plate compressor or radial piston compressor/motor) in the open state in the form of a reference valve.

FIG. 1 shows the basic construction of a nonreturn valve on the low-pressure side, in the form of a reference valve for the subject matter of the disclosure, said valve corresponding to the outlet valve in a hydraulic motor. In a pump, the valve would be the inlet valve or suction valve.

According to FIG. 1, the low-pressure valve or outlet valve 22 has a valve body 40 which is prestressed into an open position by a spring 38 and can be adjusted by means of a magnetic actuator 30 into a closed position against a valve seat 42 such that an annular throughflow cross section 44 is blocked. The outlet valve 22 is embodied in the form of a "disk valve", the valve element 40 having a tappet 46 which bears an approximately mushroom-shaped closing disk 48 on the lower end section thereof in FIG. 1. When the throughflow cross section 44 is open (view according to FIG. 1), a pressure medium connection between a connecting passage A on the inlet side and a passage B opening in a working space 8 of the hydraulic machine is opened, and therefore pressure medium can flow from the inlet passage A into the working space 8 or in the opposite direction, from the working space 8 to the passage A. During passage of the flow from A to B, virtually no flow forces effective in the closing direction occur, and therefore the valve disk 48 could in principle be held in the open position thereof solely by the force of the spring 38. Upon flow from B to A, the forces resulting from the pressure medium flow act in the closing direction, and therefore the spring 38 is no longer sufficient by itself in order to hold the valve disk 48 in the open position thereof. In order to fix the open position, which is illustrated in FIG. 1, of the valve disk 48, the actuating magnet 30 is formed, according to the disclosure, with a main coil 50 and a secondary coil 52 to which a main armature 54 and a secondary armature 56 are respectively assigned. According to the disclosure, the valve disk 48 is held in the open position thereof by the secondary coil 52 being energized. The latter, upon being energized, generates a magnetic field by means of which—as explained in more detail below—the valve body 48 is held in the open position thereof.

According to the disclosure, in the illustrated basic position of the low-pressure valve or outlet valve 22, the main coil 50 can also be energized. The magnetic field generated in the process acts in the closing direction on the valve disk 48—but in the relative position illustrated, the force acting on the valve disk 48 via the coil 50 is smaller than the force generated via the secondary coil 52, and therefore the valve disk 48 is held in the illustrated open position when the coils 50, 52 are energized simultaneously.

The valve 22 has a valve bushing/collet 58 which can be screwed into a corresponding bore in a hydraulic machine housing 2. The valve bushing 58 opens axially via the passage B in the working space 8 and furthermore has a star-shaped radial bore 60 opening in the passage B. A seat bushing 62, in the circumferential wall of which an outlet passage 64 opening at one end toward the passage A and at the other end toward the valve seat 42 is formed, is screwed into the valve bushing 58. A multiplicity of connecting webs 66 dividing the annular outlet passage 64 into circular ring segments are formed in that end section of the outlet passage 64 which is on the valve-seat side. The mouth regions of said circular ring segments form an encircling inner sealing edge 68 and an outer sealing edge 70 which are each positioned obliquely with respect to the valve axis and on which, when the outlet valve 22 is closed, encircling sealing surfaces 72, 74 of the valve disk 48 rest in a sealing manner such that the annular throughflow cross section 44 is blocked.

According to the illustration in FIG. 1, the valve disk 48 is of mushroom-shaped design, with the two sealing surfaces 72, 74 being formed on the rear side which faces away from the working space 8. In the exemplary embodiment illustrated the valve tappet 46 passes through a rearwardly projecting hub projection 76 of the valve disk 48 where it is held in a rotationally fixed manner. In the exemplary embodiment illustrated, the tappet 46 and the valve disk 48 are axially connected via a tension spring 78 which is held in a spring holder 80 of the spring plate 48 and is supported on the base of the spring holder 80 via a spring plate. That end section of the tension spring 78 which is remote from said base acts on a spring plate 82 which is fastened to the lower end section, in FIG. 2, of the tappet 46 and runs somewhat spaced apart axially from the adjacent end surface 84 of the spring plate 48 such that the latter is mounted in a spring-elastic manner on the tappet 46 by means of the force of the tension spring 78.

That part of the tappet 46 which upwardly adjoins the hub projection 76 in FIG. 1 is held in an axially displaceable manner in a guide bushing 86 of a multi-part coil former 88 which dips by means of radial projections into corresponding recesses of the seat bushing 62 and is secured there via a spring ring 90. The guide bushing 86 has an axial guide bore 92 for the tappet 46. In the closed position, the hub projection 76 dips into an end recess 94 of the guide bushing 86.

Figure 2:
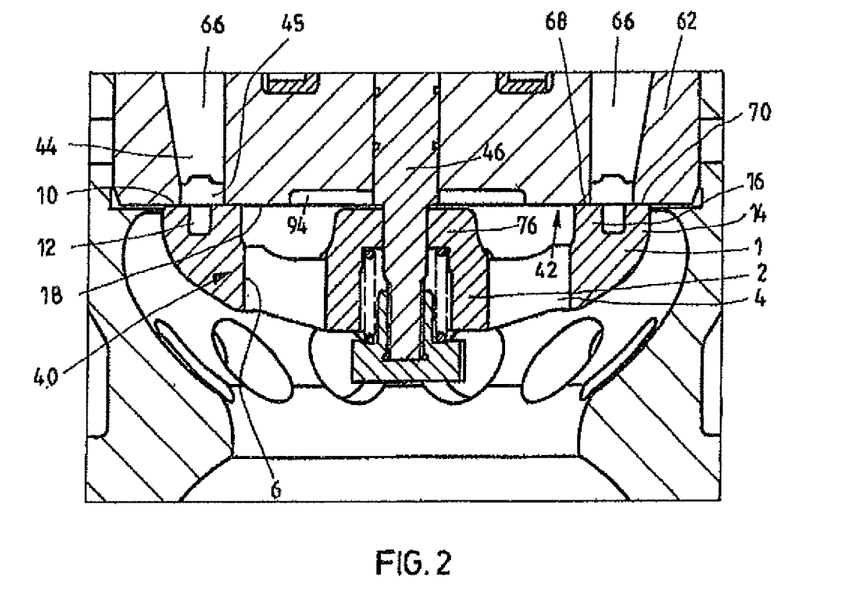
FIG. 2 shows a partial longitudinal section of a valve according to a first exemplary embodiment in which the structural features differing from the reference valve are illustrated.

Radially outside the guide bore 92, an annular recess 96, into which sections of the secondary coil 52 are inserted, is provided on the guide bushing 86. The secondary coil 52 is covered toward the top (FIG. 1) by a magnetizable pole ring 98 which is adjoined in the axial direction by a separating ring 100. Said separating ring 100 is supported on the base of a casing section 102 of the guide bushing 86, which dips into a corresponding inner recess 104 of the seat bushing 62. A coil holder 106 which extends downward toward the base of the guide bushing 86 with an axial projection 108 is inserted into said region of the guide bushing 86 which is engaged around by the casing section 102. Said axial projection 108 is engaged around by the main coil 50 which is therefore inserted into the annular space between the coil holder 106 and the casing section 102 of the guide bushing 86. That end surface of the main coil 50 which is located at the bottom in FIG. 2 is supported axially on the separating ring 100 via a further pole ring 110.

Level with the separating ring 100, the guide bushing 86 has a disk-shaped section 87 made of a para-magnetic material, for example a stainless steel, which section is connected, for example by welding, to the two other parts of the guide bushing 86 which conduct the magnetic field, and at the same time contributes to the magnetic fields of the two coils 50 and 52 being clearly separated from each other. When the coil is energized, there is therefore no dynamic effect on the valve body 40 in an undesired direction.

That end section of the tappet 46 which is located at the top in FIG. 1 passes through an inner bore 112 in the coil holder 106. Said inner bore is widened in the central region thereof to form a spring space 114 for the spring 38. The latter is supported at one end on an annular shoulder 116 of the spring space 114 and acts at the other end on the main armature 54 which, together with the adjacent end surface of the axial projection 108 of the coil holder 106, delimits a main working air gap 118 of a main stage of the magnetic actuator 30. To optimize the characteristic of the magnet, the main armature 54 dips with an armature projection 120 into an end recess 122 of the axial projection 108.

That end surface of the main armature 54 which is located at the bottom in FIG. 1 and is remote from the main working air gap 118 bears against a distance washer 124 via which the secondary armature 56 is spaced apart in the axial direction from the main armature 54. The secondary armature 52 acts by means of its end surface, which is formed with an annular projection 126, on a radially projecting supporting shoulder 128 of the tappet 46 such that the force of the spring 38 is transmitted via the main armature 54, the spacer ring 124 and the secondary armature 56 to the tappet 46 and prestresses the latter downward (FIG. 1) such that the spring plate 48 is held by the spring force in its illustrated open position. A secondary working air gap 130 which is minimal in the open position of the outlet valve 22 is formed between that end surface of the secondary armature 52 which is provided with the annular projection 126 and the correspondingly configured end surface of the guide bushing 86.

The two coils 50, 52 are energized via the control electronics 132 fitted on the multi-part coil former 86.

When the secondary coil 52 is energized, the valve disk 48 is magnetically locked in the open position thereof. In order to close the valve disk 48, as already explained above, first of all the two coils 50, 52 are energized in the illustrated open position of the outlet valve 22, with the abovementioned secondary working air gap 130 being minimal. In this position, the main working air gap 118 is at maximum, and therefore the magnetic force acting on the main armature 54 is correspondingly small and the valve disk 48 therefore continues to be locked in its open position by the force of the spring 38 and the magnetic field generated by the secondary coil 52, even when the current strength is low. As can be gathered from the illustration according to FIG. 2, the separating ring 100 which is produced from para-magnetic material causes the magnetic fields of the two coils 52, 54 to be separated. Without such a separation of the magnetic fields, the magnetic field generated by the main coil 50 could flow through the secondary working air gap 130 or the magnetic field generated by the secondary coil 52 could flow through the main working air gap 118, and therefore a magnetic force could be generated in the undesired direction. Accordingly, the components are selected in respect of the material such that there need not be any concern that the two magnetic fields will combine when the coils 50, 52 are energized simultaneously. For this reason, the seat bushing 62 is also produced from a para-magnetic material. The components of the coil former 88 (guide bushing 86, coil holder 106, pole rings 98, 124 and separating ring 98) are preferably connected frictionally to one another and behave as a single component within the valve structure.

Owing to the already minimal secondary working air gap 130, even at a low current level, the secondary armature 56 develops a sufficient force in order to keep the outlet valve 22 open. The locking force can be matched to the use conditions by varying the current level. This may be required, for example at higher rotational speeds of the hydraulic machine, if the pistons 6 press high volumetric flows through the outlet valve 22.

As soon as the magnetic field of the main coil 50 has been built up, the secondary coil 52 is switched currentlessly to close, and therefore the magnetic force component which is effective in the opening direction is dispensed with, and the main armature 54 carries out a stroke upward counter to the force of the spring 58 and, in the process, closes the main working air gap 118. The main armature 54 carries along the tappet 46 at the same time here, and therefore the secondary armature 52 is moved upward in the axial direction and the secondary working air gap 130 is enlarged. The valve disk 48 executes a corresponding stroke until the two sealing surfaces 72, 74 rest on the sealing edges 78 and 70, respectively, and the throughflow cross section 44 is closed. Said closing force can likewise be adjusted, again by varying the current level in order to energize the main coil 50.

An advantage of this concept is that the magnetic field of the main coil 50 is already completely built up before the outlet valve 22 is closed and therefore exerts the maximum possible force on the valve disk 48. The valve disk 48 is then virtually prestressed. The comparatively small secondary coil 52 converts the activating signal (independently on/off) substantially more rapidly owing to its significantly smaller time constant in comparison to the main coil 50, thus increasing the dynamics of the valve.

In order to open the valve, the main coil 50 is switched currentlessly such that the valve disk 48 is moved back into the basic position thereof by the force of the spring 38. Said opening movement can be assisted by the secondary coil 52 being energized, and therefore the resetting movement of the valve disk 48 is accelerated. This permits higher valve dynamics, both in the closing direction and in the opening direction of the outlet valve 22, than in conventional solutions.

A valve according to a first exemplary embodiment of the disclosure is described below with reference to FIGS. 2 and 3. Only the features which differ from the reference valve according to FIG. 1 are dealt with here, with all of the other structural features and functions being the same as in the reference valve. To this extent, reference is made at this juncture to the description above in respect of the features which are not expressly illustrated and/or described in FIGS. 2 and 3.

FIG. 2 is a partial longitudinal sectional view of the low-pressure or outlet valve 22 according to the disclosure, the view showing the valve seat section 42 together with the associated valve body 40.

In the first preferred exemplary embodiment of the disclosure according to FIG. 2 too, the valve body 40 is formed as a mushroom-shaped valve disk consisting of an outer sealing ring 1, an inner valve body hub 2 and a number of radially extending webs/spokes 4 which connect the valve body hub 2 to the outer sealing ring 1 with throughflow openings 6 being formed. The radially outer sealing ring 1 has a planar (flat) contact surface 10 into which an encircling groove 12 is incorporated (milled). By this means, the contact surface 10 is divided into two sealing lips or sealing edges 14, 16 which are spaced apart radially by the groove 12.

On the side of the seat bushing 62, the valve seat 42 is likewise formed by a planar end surface 18 of the seat bushing 62, in which end surface the throughflow cross sections 44 which are separated from one another by the webs 66 open out in an encircling axial groove 45. The sealing edges 14, 16 which are spaced apart radially from each other are oriented here in such a manner that, when the valve 22 is closed as per FIG. 2, said sealing edges sit in a sealing manner on the planar end surface 18 of the seat bushing 62 and therefore close the axial groove 45 in the end surface 18 of the seat bushing 62. Owing to the groove 12, it is reliably ensured that both the sealing edge 14 and the sealing edge 16 bear against the seat body 62.

The inner valve body hub 2 is configured in a similar manner to the valve body hub according to FIG. 1, i.e. with the hub projection 72, in which the valve tappet 46 is guided in a sliding manner, and with the spring holder 80, into which the tension spring 78 is inserted, the tension spring pressing the valve body 40 against the valve seat 42. However, in contrast to the reference valve, the valve body hub 2 does not protrude axially over the sealing edges 14, 16 but rather is set back axially behind the sealing edges 14, 16. For this reason, the planar end surface 18 of the seat bushing 62 does not have to be formed with any end recess, as in the reference valve, or the end recess 94 can be formed as a flat and optionally planar turned groove such that the guide bore 92 in the seat bushing 62 obtains a maximum length.

As can furthermore be gathered from FIG. 2, in the closed state of the valve 22, the two sealing edges 14, 16 protrude radially in the region of the valve seat 42 into the mouth openings of the passages 64 such that only a radially outer or inner part of each sealing edge 14, 16 is in contact with the end surface 18 of the seat bushing 62. By this means, the mouth opening edges press slightly into the flat sides of each sealing edge 14, 16, thus resulting in a fluidtight closure of the mouth openings.

Figure 3:
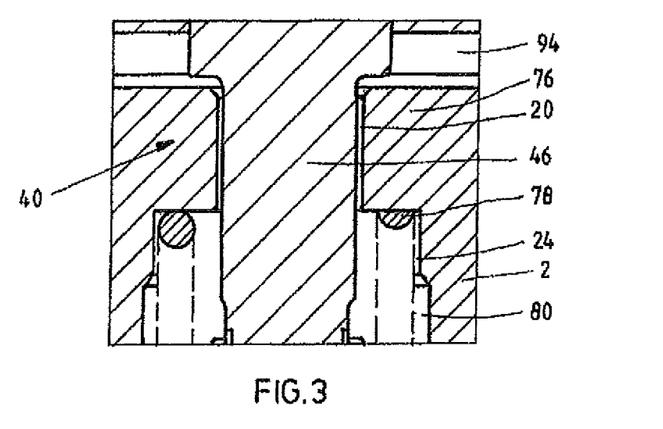
FIG. 3 shows an enlargement of the connecting section between the closing element and armature tappet of the valve according to the disclosure from FIG. 2.

FIG. 3 shows the connecting region between the valve tappet 46 and valve body hub 2 on an enlarged scale.

According thereto, the valve tappet 46 penetrates the valve body hub 2 with an annular gap 20 (illustrated exaggerated in FIG. 3) of preferably approx. 0.1 mm width being formed. By this means, the mushroom-shaped valve body 40 can not only be displaced axially in relation to the valve tappet 46 within the scope of the maximum adjustment distance of the tension spring 78 in order to compensate for an excessive stroke of the valve tappet 46 and in order to achieve a sufficiently high contact pressure of the valve body 40 against the valve seat 42 but can also tilt slightly with respect to the valve tappet 46. By means of this tilting movement which is permitted to a limited extent, the valve body 40, upon coming into contact with the valve seat 42, is matched virtually automatically to deviations in the orientation of the end surface 18 of the seat bushing 62 and therefore ensures a secure sealing seat on the seat bushing 62. This is also assisted by the relatively short guidance of the valve body 40 on the valve tappet 46 (owing to the axially retracted hub projection 76). Therefore, tolerances, for example involving perpendicularity to the valve seat 42 and valve body 40, do not have to be selected to be as exacting as in the reference valve according to FIG. 1, which simplifies the manufacturing of the components and therefore also improves the functionality.

Furthermore, the inner section of the spring holder 80 is formed with a radial constriction 24 which serves to guide the tension spring 78 and therefore replaces or renders superfluous the additional spring plate (shown in FIG. 1) on the inner spring seat.

The manner of operation of the valve 22 according to the first preferred exemplary embodiment of the disclosure is the same as for the reference valve according to FIG. 1, and therefore reference can be made at this juncture to the corresponding passages in the description. A further crucial factor in the first exemplary embodiment according to the disclosure is the double flow around the valve body 40 in the region of the outer sealing ring or closing member 1 which, in the open state of the valve 22, opens up two throughflow cross sections (circulating flow profiles) between itself and the valve housing or the valve bushing 58.

Figure 4:
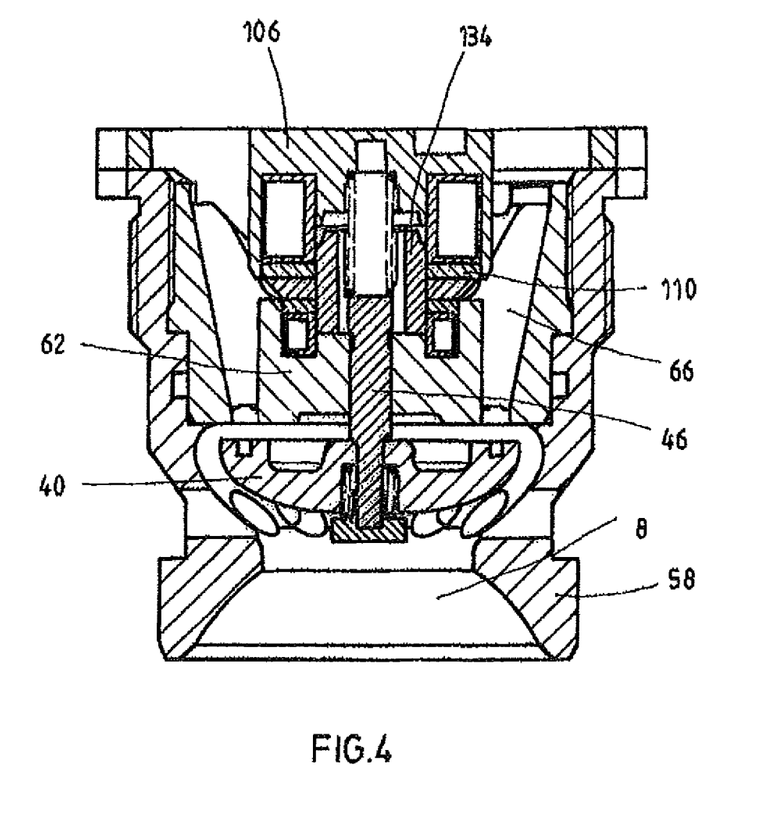
FIG. 4 shows a longitudinal section through a valve on the low-pressure side according to a second exemplary embodiment of the disclosure.

FIG. 4 shows a second exemplary embodiment of a valve 22 according to the disclosure. In this case too, only those technical features which differ from the first preferred exemplary embodiment of the disclosure will be described in more detail below. Otherwise, reference is made to the above passages in the description which also apply to the second exemplary embodiment.

In the valve according to the disclosure according to FIG. 2, as in the reference valve according to FIG. 1, the magnet armature consists of a total of four individual components, namely the guide rod or valve tappet 46,
the main armature 54,
the secondary armature 56 and
the distance washer or spacer ring 124.

The valve tappet 46 here is guided in two further components, namely the coil former 88 and
the cover or coil holder 106.

This arrangement is disadvantageous in so far as, firstly, the outlay on manufacturing to produce the four abovementioned components with extremely exacting tolerances is very high and, secondly, the installation has to be carried out with great care in order to achieve exact axial orientation of the components for clamping-free movement of the valve tappet. In addition, the guides in the coil former 88 and in the coil holder 106 have to be manufactured with a relatively large amount of play in order to avoid jamming of the magnet armature or valve tappet 46.

In the valve 22 according to FIG. 4, the magnet armature 134 is manufactured from a single component. Put in other words, the valve 22 according to FIG. 4 has the valve seat bushing 62, on the planar seat bushing end surface 18 of which the valve seat 42 is formed (as in FIGS. 2 and 3). A guide bore 36 (in contrast to FIGS. 2 and 3) is formed in the valve seat bushing 62 for the direct, displaceable mounting of the valve tappet 46 in the valve seat bushing 62. Main and secondary armatures according to the first exemplary embodiment of the disclosure and also the reference valve are replaced by the single/individual magnet armature 134 which is either placed onto the valve tappet 46 or is formed integrally therewith.

Furthermore, the valve tappet 46 ends below the coil holder 106 which, in the present exemplary embodiment, is screwed onto the end sides of the webs 66. In contrast to the previous exemplary embodiment according to FIG. 2, the coil holder 106 therefore does not have any guiding function. The fit between the valve tappet 46 and valve seat bushing 62 is selected here to be highly exacting (substantially free from play) in order, inter alia, to keep tilting of the valve tappet 46 to a minimum. Should slight tilting nevertheless occur, the further pole ring 110 takes on the function of a second guide.

Another advantage of this arrangement according to the second preferred exemplary embodiment of the disclosure resides in simpler manufacturing and a reduction in the tolerance chains. In addition, the friction of the magnet armature/valve tappet 46 is reduced, which further increases the valve dynamics.

Figure 5:
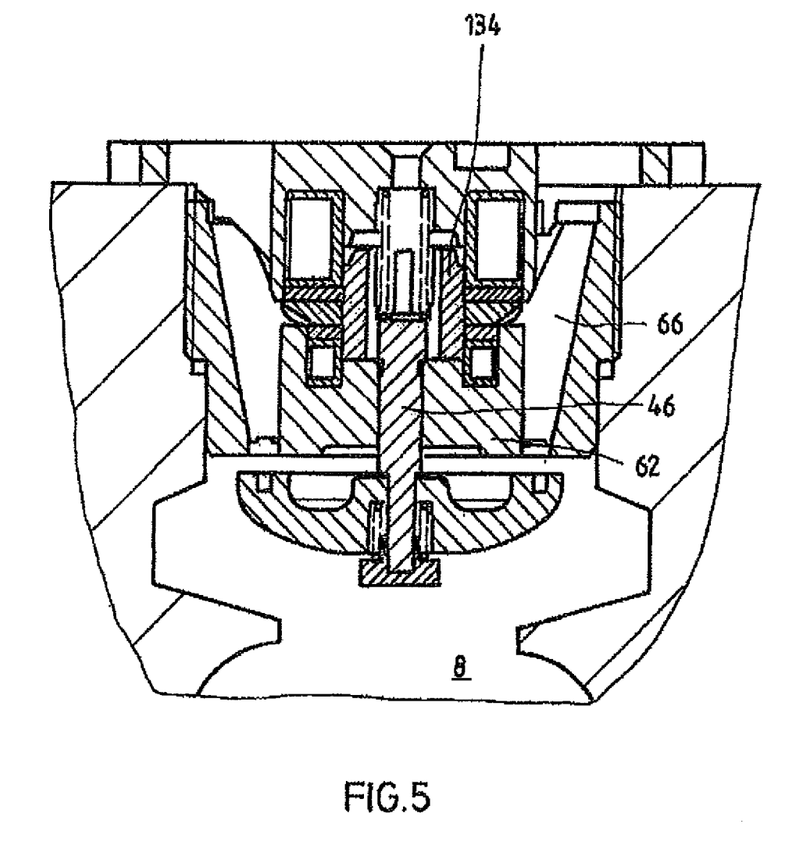
FIG. 5 shows a longitudinal section through a modified valve according to the second preferred exemplary embodiment of the disclosure.

Finally, FIG. 5 illustrates a modification of the second exemplary embodiment of the disclosure.

This involves an individual magnet armature construction, as has been previously described with reference to FIG. 4 but, in contrast to the exemplary embodiment according to FIG. 4, a valve bushing/valve housing is not provided. That is to say, the valve 22 consists exclusively of the valve seat bushing 62 which is screwed directly into the housing of the hydraulic machine. In this case, the fluid passages formed in the valve seat bushing 62 in the first and second exemplary embodiments are formed directly in the housing of the hydraulic machine. The working space 8 receiving the valve body 40 is also located in the housing of the hydraulic machine.

All of the further structural features are identical to the second exemplary embodiment of the disclosure according to FIG. 4. As an alternative thereto, however, the valve according to the first preferred exemplary embodiment of the disclosure could also be formed without the valve bushing/valve housing in order to be screwed directly into the housing of the hydraulic machine.

The concept according to the disclosure can be used in valves both on the low-pressure side and high-pressure side, which valves may be closed or open when not energized.

LIST OF REFERENCE NUMBERS

1 Outer sealing ring
2 Inner valve body hub
4 Radial webs
6 Throughflow openings
8 Working space
10 Planar contact surface
12 Encircling groove
14 Radially outer sealing edge
16 Radially inner sealing edge
18 Seat bushing end surface
20 Annular gap
22 Outlet valve
24 Constriction in the spring holder
26 Magnetic actuator
30 Magnetic actuator
34 Control unit
36 Guide bore
38 Spring
40 Valve body
42 Valve seat
44 Throughflow cross section
45 Axial groove
46 Tappet
48 Valve disk
50 Main coil
52 Secondary coil
54 Main armature
56 Secondary armature
58 Valve bushing
60 Star-shaped radial bore
62 Seat bushing
64 Outlet passage
66 Web
68 Sealing edge
70 Sealing edge
72 Sealing surface
74 Sealing surface
76 Hub projection
78 Tension spring
80 Spring holder
82 Spring plate
84 End surface
86 Guide bushing
87 Disk-shaped section
88 Coil former
90 Spring ring
92 Guide bore 94 End recess
96 Recess
98 Pole ring
100 Separating ring
102 Casing section
104 Inner recess
106 Coil holder
108 Axial projection
110 Further pole ring
112 Inner bore
114 Spring space
116 Annular shoulder
118 Main working air gap
120 Armature projection
122 End recess
124 Spacer ring
126 Annular projection
128 Radial shoulder
130 Secondary working air gap
132 Control electronics
134 Individual magnet armature

What is claimed is:

1. An electromagnetically actuated valve, comprising:
a valve seat;
a valve body movable in relation to the valve seat between a first position and a second position, the valve body being spring biased toward the first position;
a magnetic actuator configured to move the valve body from the first position to the second position,
wherein the valve body includes a first planar contact surface having a first encircling sealing surface and a second encircling sealing surface that are concentrically positioned with respect to each other,
wherein the valve seat includes a second planar contact surface having a first planar seat portion and a second planar seat portion that are spaced apart from each other,
wherein the first planar contact surface is positioned in contact with the second planar contact surface when the valve body is positioned in one of the first position and the second position,
wherein the first encircling sealing surface is configured to contact the first planar seat portion, and the second encircling sealing surface is configured to contact the second planar seat portion,
wherein the valve body includes an interior groove end wall, a first interior groove side wall, and a second interior groove side wall that collectively define an annular groove having a groove opening,
wherein the first interior groove side wall extends from the first encircling sealing surface to the interior groove end wall, and the second interior groove side wall extends from the second encircling sealing surface to the interior groove end wall, and
wherein the groove opening is interposed between the first encircling sealing surface and the second encircling sealing surface.

2. The electromagnetically actuated valve according to claim 1, wherein:
the valve body includes a valve tappet, an inner valve body hub mounted on the valve tappet, a radially outer sealing ring, and radial webs extending between the inner valve body hub and the radially outer sealing ring, and
the first planar contact surface is formed on the radially outer sealing ring.

3. The electromagnetically actuated valve according to claim 2, wherein:
when the valve body is positioned in the first position, the first planar contact surface is spaced apart from the second planar contact surface, and
when the valve body is positioned in the second position, the first planar contact surface is positioned in contact with the second planar contact surface.

4. The electromagnetically actuated valve according to claim 2, wherein the valve seat is formed on an end side of a valve seat bushing in which axially extending fluid passages are formed, the fluid passages forming mouth openings, which are closeable by the valve body, on the end side of the valve seat bushing, the valve seat bushing having an installation device, in the form of an external thread, for direct fitting of the valve seat bushing in a housing of a hydraulic machine without an intermediate sleeve or an adapter.

5. The electromagnetically actuated valve according to claim 4, wherein the valve tappet is guided in an axially displaceable manner exclusively in the valve seat bushing and is biased in one direction by a spring.

6. The electromagnetically actuated valve according to claim 2, wherein an installation bore formed in the inner valve body hub has a radial excess size with respect to the valve tappet in such a manner that the valve body is tiltable with respect to the planar surface of the valve seat.

7. The electromagnetically actuated valve according to claim 2, wherein the valve body is mounted resiliently on the valve tappet.

8. The electromagnetically actuated valve according to claim 1, wherein the valve is a low-pressure valve.

9. The electromagnetically actuated valve according to claim 1, wherein:
the valve seat defines a valve seat flow through passage,
the valve body defines a valve body flow through passage, and
the groove opening is aligned with the valve seat flow through passage when the first planar contact surface is positioned in contact with the second planar contact surface.

10. The electromagnetically actuated valve according to claim 9, wherein the first encircling sealing surface is interposed between the groove opening and the valve body flow through passage.

11. The electromagnetically actuated valve according to claim 10, wherein the valve seat flow through passage is interposed between the first planar seat portion and the second planar seat portion.

12. An electromagnetically actuated valve having a valve body and a valve seat operatively associated therewith, wherein the valve body is mechanically prestressed in a first direction toward a first switching position and is configured to be adjusted by a magnetic actuator in a second, opposite direction into a second switching position, and further wherein the valve body has a planar contact surface divided into two concentrically encircling sealing surfaces which are respectively assigned a sealing edge of a planar surface of the valve seat, the planar contact surface configured to be brought into sealing contact with the planar surface of the valve seat, and further wherein the planar surface is planar at least in sections, and further wherein the valve body includes an interior groove end wall, a first interior groove side wall, and a second interior groove side wall that collectively define an annular groove having a groove opening, the first interior groove side wall extending from a first of the two encircling sealing surfaces to the interior groove end wall, and the second interior groove side wall extending from a second of the two encircling sealing surfaces to the interior groove end wall, and wherein the groove opening is interposed between the first of the encircling sealing surfaces and the second of the encircling sealing surfaces.

13. The electromagnetically actuated valve according to claim 12, wherein the planar contact surface is formed on a radially outer sealing ring of the valve body, which sealing ring is connected via radial webs to an inner valve body hub which is mounted on a valve tappet.

14. The electromagnetically actuated valve according to claim 13, wherein the first switching position is the open position of the valve body, in which the outer sealing ring opens up radially inner and outer circulating flow paths.

15. The electromagnetically actuated valve according to claim 13, wherein an installation bore formed in the inner valve body hub has a radial excess size with respect to the valve tappet in such a manner that the valve body is tiltable with respect to the planar surface of the valve seat.

16. The electromagnetically actuated valve according to claim 13, wherein the valve body is mounted resiliently on the valve tappet.

17. The electromagnetically actuated valve according to claim 12, wherein the valve seat is formed on an end side of a valve seat bushing in which axially extending fluid passages are formed, the fluid passages forming mouth openings, which are closeable by the valve body, on the end side of the valve seat bushing, the valve seat bushing having an installation device, in the form of an external thread, for direct fitting of the valve seat bushing in a housing of a hydraulic machine without an intermediate sleeve or an adapter.

18. The electromagnetically actuated valve according to claim 17, wherein the valve tappet is guided in an axially displaceable manner exclusively in the valve seat bushing and is prestressed in one direction by a spring.

19. The electromagnetically actuated valve according to claim 12, wherein the valve is a low-pressure valve.

* * * * *